C. R. LOTT.
MEANS AND METHOD FOR PRODUCING CHARGES OF MOLTEN GLASS.
APPLICATION FILED JAN. 7, 1920.
1,382,993.
Patented June 28, 1921.
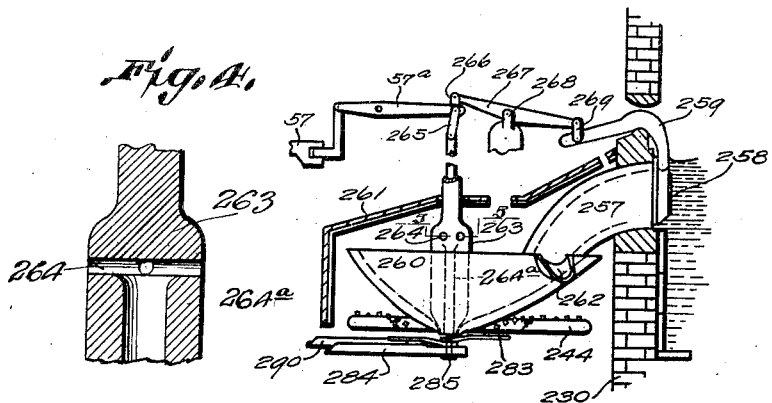
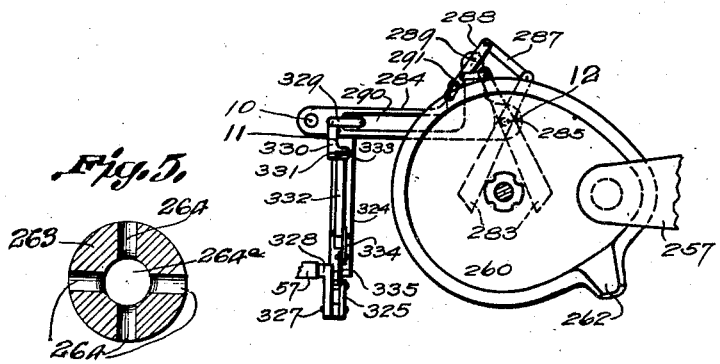
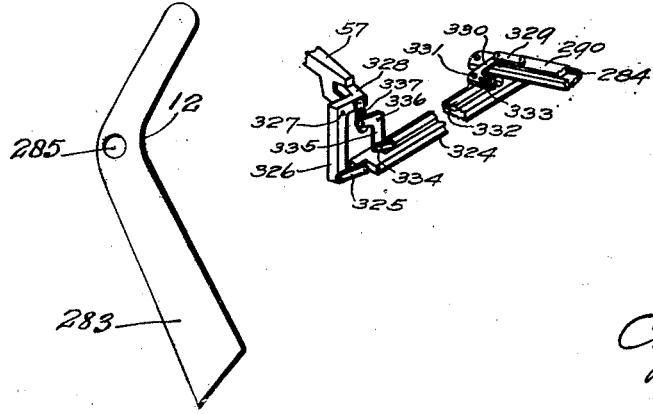
INVENTOR
Clyde R. Lott,
By J. F. Rule
His attorney.

UNITED STATES PATENT OFFICE.

CLYDE R. LOTT, OF WASHINGTON, DISTRICT OF COLUMBIA, ASSIGNOR TO THE GUARDIAN TRUST AND SAVINGS BANK OF TOLEDO, TRUSTEE, OF TOLEDO, OHIO, A CORPORATION OF OHIO.

MEANS AND METHOD FOR PRODUCING CHARGES OF MOLTEN GLASS.

1,382,993.  Specification of Letters Patent.  Patented June 28, 1921.

Original application filed September 27, 1909, Serial No. 519,678. Divided and this application filed January 7, 1920. Serial No. 349,922.

*To all whom it may concern:*

Be it known that I, CLYDE R. LOTT, a citizen of the United States, residing at Washington, in the District of Columbia, have invented new and useful Improvements in Means and Methods for Producing Charges of Molten Glass, of which the following is a specification.

My invention relates to a method and apparatus for flowing molten glass from a tank or container and separating it into individual masses or charges to be used in making and forming glass bottles, jars or other articles.

An object of the invention is to provide suitable mechanism for providing charges or masses of glass especially adapted for making open ware or articles of comparatively large size. Other objects of the invention will appear hereinafter.

The present application is a division of my co-pending application, Serial Number 519,678, filed September 27, 1909, apparatus for making glass articles.

In the accompanying drawings:

Figure 1 is a part sectional elevation of the apparatus.

Fig. 2 is a plan view of a portion of the apparatus, showing particularly the shears and their operating mechanism.

Fig. 3 is a perspective view of a portion of the shear operating mechanism.

Fig. 4 is a longitudinal section of the plunger valve enlarged and broken away.

Fig. 5 is a section at the line 5—5 on Fig. 1.

Fig. 6 is a detail view enlarged of one of the shear blades.

Molten glass is supplied from a furnace 230. A charger 260 is provided with an intake pipe 257 whose one end is normally closed by a valve 258 connected with a lever 259, which is operated by a lever 57ª operated by a lever 57 to open and close the valve. The charger 260 as shown is a shallow funnel shaped container arranged below the outer end of the outlet, and the outlet and the container are inclosed by a casing 261. The container is provided with an overflow spout 262 and with an opening in its bottom.

The opening is closed by a valve 263 having air openings 264 therethrough by which the air passage 264ª extending longitudinally of the valve to the lower end thereof is kept open to atmospheric pressure, and a link 265 connects the upper end of the stem of the valve with the lever 57ª which is operated by the lever 57. The lever 57 is periodically actuated to move vertically by any suitable means, as for example, that fully disclosed in my copending application, Serial Number 519,678, above referred to.

A second link 266 connects the lever 57ª with the end of another lever 267 pivoted as at 268, and the opposite end of the lever 267 is connected by a link 269 with the inner end of the elbow lever 259 to which is connected the valve 258.

The shears as shown comprise a pair of blades 283 pivoted together and to a bar 284 as at 285. The blades do not cross at the pivot point but their rearwardly-extending shanks are turned outward at the point 12 at a substantial angle to the blades, so that as the rear ends of the shanks are moved toward each other the blades are separated. The shanks are connected by links 287 with the opposite ends of a lever 288 pivoted as at 289 to the bar 284. A second bar 290 is connected to operate the lever 288 by a wrist pin 291 sliding in a slot in the extended end of the lever 288. The bar 284 is mounted to swing about a stationary pivot 10.

The shears are operated by an arm 324, whose one end is pivotally connected at 11 to the bar 284 and whose other end is connected by a link 325 with one of the arms of an elbow lever 326, which is pivoted as at 327 to a stationary support (not shown), and whose other end is provided with a lateral extension 328 which engages the recess in the end of the lever 57.

The free end of the bar 290 is connected by a link 329, with one of the arms of an elbow lever 330 pivoted as at 331 on the bar 324 and whose other arm is slotted and connected to a longitudinally movable bar 332 by means of a pin 333 engaging the slot and the opposite end of the bar is connected by a link 334 with one of the arms of an elbow lever 335, pivoted as at 336 to a stationary support (not shown), and whose other end is connected by a link 337 with that arm of the lever 326 having the lateral lug 328, the connection between the link and the arm of the lever 335 being a lost motion connection as shown.

In operation as the lever 57 moves downward, it operates through the elbow lever 326 and arm 324 to swing the bar 284 about its pivot 10 and thereby move the shears bodily forward to the Fig. 2 position. During this movement the lost motion in the link 337 is taken up so that the continued movement of the lever 326 operates through the elbow lever 335, bar 332 and elbow lever 330 to move the bar 290 longitudinally rearwardly along the bar 284 toward the pivot 10. This swings the lever 288 on its pivot, and the blades are moved together. A reverse movement of the bar moves the blades apart.

It will be noted that the valve plug or plunger 263 is arranged to reciprocate vertically within the container or receptacle 260. Also the connections between the valve 263 and the valve 258 will cause the valves to operate in synchronism, the valve 258 being moved forward or toward the intake pipe or spout 257 as the valve 263 is lowered. The valve 258 will obviously control the transfer of glass from the furnace or main supply chamber through the passageway 257 to the auxiliary chamber 260, causing a fluctuating or intermittent flow through the spout. That is to say, each time the valve 258 moves back to open position, it admits a predetermined quantity of glass to the mouth of the spout 257, and as the valve moves forward to closed position it exerts an impelling force on the glass, which assists in advancing it through the spout.

The shears are operated in synchronism with the operation of the valves, as each reciprocation of the actuating lever 57 will cause one complete operation of the shears.

The air passage 264ª in the plunger valve 263 prevents air being trapped in the glass at the lower end of the plunger and also assists in giving a tapered or pointed lower end on the issuing gob of glass. Without such opening, there is a tendency for the glass adhering to the lower end of the plunger after a charge has been severed, to be drawn upward with the plunger. As the latter moves upward there is also a tendency for the glass surrounding it, at the commencement of its upward movement, to roll in and trap a bubble of air. By providing the air channel, the glass at the lower end of the plug draws down more freely, forming a tapered or pointed end on the gob of glass which is beginning to form and issue from the orifice, and also tends to prevent the entrapping of air in the issuing glass.

Variations may be resorted to within the spirit and scope of my invention.

What I claim is:

1. In an apparatus for delivering charges of molten glass, the combination of a tank to contain molten glass, a charging device having a receiving chamber located externally of the tank, and positively operated means operating in the glass for periodically supplying uniform charges of molten glass from the tank to said chamber, and means for periodically discharging charges of glass from said chamber.

2. In an apparatus for delivering charges of molten glass, a main supply chamber, an auxiliary chamber having an outlet, means operating in the glass to govern the delivery of a supply of molten glass from the main chamber to the auxiliary chamber, a mechanical device movable within the auxiliary chamber for controlling the discharge therefrom, means for severing charges from the glass delivered through the outlet opening, and means for operating said governing means, discharge controlling device and severing means in synchronism.

3. In an apparatus of the character described, the combination of a main glass supply tank, a charge feed chamber, positively operated movable mechanical means normally in contact with glass in the tank operative in its movement to control the supply of glass to the charge feed chamber from the tank, said charge feed chamber having an outlet, and a mechanical controlling device within said chamber controlling discharge of glass through said outlet.

4. In glass feeding mechanism, the combination of a receptacle for a main supply of molten glass, a charge feed chamber adjacent thereto and having means of communication therewith, a movable member projecting into the main receptacle and operative in its movement to regulate the feed of glass from the receptacle to the charge feed chamber, a vertically movable body controlling the discharge of glass through the outlet of the charge feed chamber, shearing mechanism to sever the discharged glass as delivered from the charge feed chamber, and operatively connected mechanism for operating said member, the vertically movable body and the shear mechanism in synchronism.

5. The method of feeding molten glass, which consists in intermittently delivering from a tank to a container exterior thereof, predetermined quantities of molten glass, causing the same to be intermittently discharged downward from the container through an outlet orifice and subjecting the discharged glass to the action of a mechanical shearing means spaced below the orifice whereby to form mold charges.

6. In combination, a furnace to contain molten glass, a receptacle into which glass passes from the furnace provided with an outlet, a device to regulate the passage of glass into said receptacle, a device adjacent said outlet to regulate the discharge of glass therefrom, and automatic means operable independently of the glass to reciprocate said devices respectively in the general direction of movement of the glass into said receptacle and of said glass through said outlet.

7. The combination of a furnace to contain molten glass, a receptacle adjacent thereto, means providing a passageway from the furnace to said receptacle, a periodically actuated mechanical device operating within said receptacle for causing the periodic discharge therefrom of predetermined quantities of glass, and a second device for controlling the transfer of glass through said passageway and having mechanical connections with said first-mentioned device for operation in a predetermined timed relation to the operation of said first mentioned device.

8. A receptacle for molten glass with an outlet opening in the bottom thereof, a plunger within the receptacle directly over said opening, means to reciprocate the plunger vertically, a pair of shears, and means to periodically project the shears bodily to a point beneath said opening and to then actuate them to sever the glass and to then withdraw them, said shears being operated in synchronism with the movements of the plunger.

9. The combination of a container for molten glass having an outlet opening, and a valve movable toward and from said opening to control the flow, said valve formed with an opening extending therethrough and normally open to atmospheric pressure.

10. The combination of a container for molten glass having a discharge orifice, and a plug movable toward and from said orifice to control the flow of glass therethrough, said plug formed with an opening extending longitudinally therethrough to the end adjacent said orifice and of smaller diameter at said end than the orifice.

11. The combination of a container for molten glass having a discharge opening in its bottom, a reciprocating body having its lower end in said container and coöperating with the discharge opening to control the discharge of glass therefrom, cutters having cutting edges arranged to approach from different directions the glass below the discharge opening, and automatic means for periodically reciprocating said body toward and from the discharge opening and for moving said cutters to cause their edges to meet in severing position below the discharge opening substantially in line with said reciprocating body and in timed relation to the movement thereof.

12. The combination of a container for molten glass having a discharge opening in its bottom, a reciprocating body having its lower end in said container and coöperating with the discharge opening to control the discharge of glass therefrom, cutters having cutting edges arranged to approach from different directions the glass protruding from the discharge opening, and automatic means for positively moving said body periodically toward the discharge opening and for moving said cutters to cause their edges to meet in severing position below the discharge opening substantially in line with said reciprocating body and in timed relation to the movement thereof.

13. In an apparatus of the character described, the combination of a main glass supply tank, a charge feed chamber, a glass controlling member normally in contact with the glass in the tank, mechanical means for positively moving said member periodically in a direction toward the charge feed chamber to control the supply of glass from the main supply tank to the charge feed chamber, said charge feed chamber having an outlet, and mechanical means within said chamber for controlling the discharge of glass through said outlet.

14. In an apparatus of the character described, the combination of a glass supply tank, a charge feed chamber for communication with the tank, having a discharge opening therein, means operating in the glass to control the delivery of glass from the tank to the chamber, positively operated mechanical means to operate said controlling means periodically and thereby cause a predetermined supply of glass to be delivered periodically from the tank to the charge feed chamber, and means operatively associated with the last mentioned means for controlling the discharge of glass through the discharge opening of the charge feed chamber.

15. In glass feeding mechanism, the combination of a receptacle for a main supply of molten glass, a charge feed chamber adjacent thereto and having means of communication therewith, a movable member projecting into the main receptacle and operative in its movement to regulate the feed of glass from the receptacle to the charge feed chamber, a vertically movable body controlling the discharge of glass through the outlet of the charge feed chamber, and operatively connected mechanism for operating said member and the vertically movable body in synchronism.

Signed at Washington, in the District of Columbia, this 29th day of December, 1919.

CLYDE R. LOTT.